US006441340B1

(12) United States Patent
Varriano-Marston (10) Patent No.: US 6,441,340 B1
(45) Date of Patent: Aug. 27, 2002

(54) REGISTERED MICROPERFORATED FILMS FOR MODIFIED/CONTROLLED ATMOSPHERE PACKAGING

(76) Inventor: Elizabeth Varriano-Marston, 18 Wilson Rd., Windham, NH (US) 03087

( * ) Notice: Subject to any disclaimer, the term of this patent is extended or adjusted under 35 U.S.C. 154(b) by 0 days.

(21) Appl. No.: 09/528,290

(22) Filed: Mar. 17, 2000

Related U.S. Application Data (60) Provisional application No. 60/132,388, filed on May 4, 1999.

(51) Int. Cl.[7] ............................................. B23K 26/36
(52) U.S. Cl. ................................................. 219/121.7
(58) Field of Search ........................ 219/121.6, 121.61, 219/121.62, 121.67, 121.7, 121.71, 121.83

(56) References Cited

U.S. PATENT DOCUMENTS

| | | | |
|---|---|---|---|
| 4,553,017 A | * 11/1985 | Addleman | ............ 219/121.61 |
| 4,777,338 A | 10/1988 | Cross | |
| 4,842,875 A | 6/1989 | Anderson | |
| 4,879,078 A | 11/1989 | Antoon, Jr. | |
| 4,910,032 A | 3/1990 | Antoon, Jr. | |
| 4,916,285 A | * 4/1990 | Baur et al. | ............. 219/121.72 |
| 4,923,650 A | 5/1990 | Antoon et al. | |
| 4,923,703 A | 5/1990 | Antoon et al. | |
| 4,962,085 A | * 10/1990 | deBarbadillo, II et al. .. 148/277 |
| 5,302,798 A | * 4/1994 | Inagawa et al. | ......... 219/121.7 |
| 5,714,762 A | * 2/1998 | Li et al. | ................... 250/559.2 |
| 5,832,699 A | 11/1998 | Zobel | |
| 6,050,832 A | * 4/2000 | Lee et al. | ...................... 439/91 |
| 6,229,114 B1 | * 5/2001 | Andrews et al. | ....... 219/121.72 |

FOREIGN PATENT DOCUMENTS

| | | |
|---|---|---|
| CA | 1307031 | 9/1992 |
| EP | 282180 A3 | 9/1988 |
| EP | 351116 A2 | 1/1990 |
| GB | 2200618 A | 8/1988 |
| GB | 2221692 A | 2/1990 |

* cited by examiner

Primary Examiner—Samuel M. Heinrich
(74) Attorney, Agent, or Firm—Scott J. Asmus; Vernon C. Maine; Maine & Asmus (57) ABSTRACT

Microperforated packaging materials for use in modifying or controlling the flow of oxygen and carbon dioxide into and/out of a fresh produce container, where the microperforations are specifically tailored in size, location and number for the specific produce. A packaging system of designating specifically tailored microperforated containers for particular fresh produce to optimally preserve the produce. A method of making the registered microperforations on the packaging material using a $CO_2$ laser and a sensor mechanism.

8 Claims, 5 Drawing Sheets

REGISTERED MICROPERFORATED FILMS FOR MODIFIED/CONTROLLED ATMOSPHERE PACKAGING

CROSS REFERENCE TO RELATED APPLICATIONS

This application claims priority under 35 U.S.C. §119(e) from U.S. patent application Ser. No. 60/132,388 filed on May 4, 1999, which is incorporated herein by reference for all purposes.

TECHNICAL FIELD OF THE INVENTION

The present invention relates to the field of packaging for respiring or biochemically active agricultural products such as fresh fruits, fresh vegetables, fresh herbs, and flowers (herein referred to collectively as fresh produce) and more particularly to registered microperforations in packaging materials for use in modifying or controlling the flow of oxygen and carbon dioxide into and/out of a fresh produce container.

BACKGROUND OF THE INVENTION

The quality and shelf life of many food products is enhanced by enclosing them in packaging that modifies or controls the atmosphere surrounding the product. Increased quality and longer shelf life result in fresher products for the consumer, less waste from spoiled produce, better inventory control, and appreciable overall savings for the food industry at both the retail and wholesale levels.

Modified atmosphere packaging (MAP) and controlled atmosphere packaging (CAP) are often used interchangeably in the industry, and much confusion exists on their exact meanings. Both refer to methods to control the atmosphere in the package. In the processed foods area, MAP is considered a static method for controlling the atmosphere whereby an initial charge of a specific gas composition, e.g. 30% $CO_2$ and 70% $N_2$, is introduced into a barrier container before sealing.

The oxygen transmission rate (OTR) of a film is expressed as cc $O_2$/$m^2$-day-atmosphere, where one atmosphere is 101325 kg/$ms^2$. Generally, a barrier container is one that has an OTR of <70 cc/$m^2$-day-atm. The units describing the flow of a particular gas through a film are "flux", expressed as cc/day-atm.

For fresh produce, the primary means to extend quality and shelf life is temperature control. However, more than 50 years of evidence from industry practices on bulk storage of fresh fruits and vegetables in refrigerated controlled atmosphere storage rooms has shown that atmosphere control can contribute greatly to quality retention and shelf life. The use of MAP/CAP for fresh produce was a natural progression once packaging technology had advanced to include the production of non-barrier (often referred to in the industry as "breathable") materials.

The goal in fresh fruit and vegetable packaging is to use MAP/CAP to preserve produce quality by reducing the aerobic respiration rate but avoiding anaerobic processes that lead to adverse changes in texture, flavor, and aroma, as well as an increased public health concern. Aerobic respiration can be defined by the following equation:

$(CH_2O)n + nO_2 \rightarrow nCO_2 + nH_2O + heat$ where $O_2$ from the air is used to metabolize carbohydrate $((CH_2O)n)$ reserves and in the process, $CO_2$, and $H_2O$ are produced and heat is generated. For each respiring item, there is an optimum $O_2$ and $CO_2$ level that will reduce its respiration rate and thereby, slow aging and degradative processes. Different fresh produce items have different respiration rates and different optimum atmospheres for extending quality and shelf life.

The concept of passive MAP became common with the development of packaging materials with OTRs of 1085 to 7000 cc/$m^2$-day-atm for fresh-cut salads. In passive MAP, the produce is sealed in packages made from these low barrier materials and allowed to establish its own atmosphere over time through produce respiration processes. Sometimes the package is gas-flushed with $N_2$ or a combination of $CO_2$ and $N_2$, or $O_2$, $CO_2$, and $N_2$ before sealing to rapidly establish the desired gas composition inside the package. Alternately, a portion of the air may be removed from the pack, either by deflation or evacuation, before the package is sealed, to facilitate rapid establishment of the desired gas content.

In CAP, the atmosphere in the package is controlled at well-defined levels throughout storage. CAP can take many forms, and may even involve enclosing gas absorber packets inside processed food barrier packages. For example, $CO_2$ absorber sachets may be sealed inside coffee containers to absorb and control the level of $CO_2$ that continues to be generated by the ground coffee. Sachets containing iron oxides are enclosed in barrier packages of fresh refrigerated pasta to absorb low levels of $O_2$ entering the package through the plastic material.

CAP of fresh produce is just a more controlled version of MAP. It involves a precise matching of packaging material gas transmission rates with the respiration rates of the produce. For example, many fresh-cut salad packages use passive MAP as described herein. If the packages are temperature-abused (stored at 6–10° C. or higher), $O_2$ levels diminish to less than 1%, and $CO_2$ levels can exceed 20%. If these temperature-abused packages are then placed back into recommended 3–4° C. storage, the packaging material gas transmission rates may not be high enough to establish an aerobic atmosphere (<20% $CO_2$, >1–2% $O_2$) so fermentation reactions cause off-odors, off-flavors, and slimy product. If the salad was in a CAP package, the $O_2$ levels would decrease and $CO_2$ levels increase with temperature abuse, but would be re-established to desired levels within a short time after the product is returned to 4° C. storage temperatures.

Today, films made from polymer blends, coextrusions, and laminate materials with OTRs of 1085 to 14,000 cc/100 $m^2$-day-atm are being used for packaging various weights of low respiring produce items like lettuce and cabbage. These OTRs, however, are much too low to preserve the fresh quality of high respiring produce like broccoli, mushrooms, and asparagus. In addition, existing packaging material OTRs for bulk quantities (>1 kg) of some low respiring produce are not high enough to prevent sensory quality changes during storage. Therefore, several approaches have been patented describing methods to produce packaging materials to accommodate the higher respiration rate requirements and higher weights of a wide variety of fresh produce items.

U.S. Pat. No. 4,842,875, U.S. Pat. No. 4,923,703, U.S. Pat. No. 4,910,032, U.S. Pat. No. 4,879,078, and U.S. Pat. No. 4,923,650 describe the use of a breathable microporous patch placed over a opening in an essentially impermeable fresh produce container to control the flow of oxygen and carbon dioxide into and out of the container during storage. Although this method works effectively, the breathable patch must be produced by normal plastic extrusion and orientation processes, whereby, a highly filled, molten plastic is extruded onto a chill roll and oriented in the machine direction using a series of rolls that decrease the thickness of the web. During orientation, micropores are created in the film at the site of the filler particles. Next, the microporous film must be converted into pressure sensitive adhesive patches or heat-seal coated patches using narrow web printing presses that apply a pattern of adhesive over the microporous web and die-cut the film into individual patches on a roll. These processes make the cost of each patch too expensive for the wide spread use of this technology in the marketplace. In addition, the food packer has to apply the adhesive-coated breathable patch over a hole made in the primary packaging material (bag or lidding film) during the food packaging operation. To do this, the packer must purchase hole-punching and label application equipment to install on each packaging equipment line. These extra steps not only increase packaging equipment costs, but also greatly reduce packaging speeds, increase packaging material waste, and therefore, increase total packaging costs.

An alternative to microporous patches for MAP/CAP of fresh fruits and vegetables is to microperforate polymeric packaging materials. Various methods can be used to microperforate packaging materials: cold or hot needle mechanical punches, electric spark and lasers. Mechanical punches are slow and often produce numerous large perforations (1 mm or larger) throughout the surface area of the packaging material, making it unlikely that the atmosphere inside the package will be modified below ambient air conditions (20.9% $O_2$, 0.03% $CO_2$).

Equipment for spark perforation of packaging materials is not practical for most plastic converting operations, because the packaging material must be submerged in either an oil or a water bath while the electrical pulses are generated to microperforate the material. The most efficient and practical method for making microperforated packaging materials is using lasers.

UK Patent Application No. 2 200 618 A and European Patent Application No. 88301303.9 describe the use of a mechanical perforating method to make perforations with diameters of 0.25 mm to 60 mm in PVC films for produce packaging. Rods with pins embedded into the surface of the cylinder are used to punch holes in the film. For each produce item to be packaged, the rod/pin configuration is manually changed so that the number of perforation rows in the film, the distance apart of the rows, the pitch of the pins used to make the holes, and the size of the holes are adjusted to meet the specific requirements of the produce. The produce requirements are determined by laboratory testing produce packed in a variety of perforated films. The invention does not disclose any mathematical method to determine the appropriate size or number of perforations to use with different produce items. In addition, the hole sizes, 20 mm to 60 mm, that are claimed would be too large to effectively control the atmosphere inside packages containing less than several kilograms of produce. Furthermore, the complicated perforation method would cause lost package production time due to equipment (perforation cylinder) change-overs for different perforation patterns. In addition the invention cautions that the produce should be placed in the package so that the perforations are not occluded and care should be taken to prevent taping over the perforations in the film. Since the perforations are not registered in a small area on the package, but are placed throughout the main body of the plastic film, the likelihood is high that perforations will be occluded by the produce inside the package or by pressure sensitive adhesive labels applied on packages for marketing purposes. When holes are blocked, the principal route for gas transmission through the film is blocked which leads to anaerobic conditions and fermentative reactions. The result is poor sensory properties, reduced shelf life and possible microbiological safety concerns. Therefore, it is important that perforations be registered in a well-defined area of the package where the likelihood of their occlusion during pack-out, storage, transportation, and retail display is minimized.

U.S. Pat. No. 5,832,699, UK Patent Application 2 221 692 A, and European Patent Application 0 351 116 describe a method of packaging plant material using perforated polymer films having 10 to 1000 perforations per $m^2$ (1550 $in^2$) with mean diameters of 40 to 60 microns but not greater than 100 microns. The patents recommend the use of lasers for creating the perforations, but do not describe the equipment or processes necessary to accomplish this task. The patents describe the limits of the gas transmission rates of the perforated film: OTR no greater than 200,000 cc/ $m^2$-day-atm (12,903 cc $O_2$/100 $in^2$-day-atm), and MVTR no greater than 800 g /$m^2$-day-atm (51.6 g /100 $in^2$-day-atm). However, the OTR of a film does not define the total $O_2$ Flux (cc $O_2$/day-atm) needed by a fresh produce package to maintain a desired $O_2$ and $CO_2$ internal atmosphere based on the respiration rate of the specific produce item, the weight of the produce enclosed in the package, the surface area of the package, and the storage temperature. A 50-micron perforation has a very small surface area ($1.96 \times 10^{-9}$ $m^2$) and a low $O_2$ Flux (about 80 cc/day-atm) compared to its very high OTR (>200,000 cc $O_2$/$m^2$-day-atm). Therefore, one 50-micron perforation would exceed the OTR limit of this invention. Furthermore, fresh produce items such as fresh spinach are very susceptible to moisture that accumulates inside packages so produce weights greater than 0.5 kg require 2–3 times more moisture vapor transmission than the upper limit described in this patent.

The above inventions do not address the issue of microperforation occlusion by produce inside the package when microperforations are placed throughout the length and width of the film. Since 20 to 100 micron holes cannot be readily seen with the naked eye, it is impossible to prevent occlusion of the microperforations either by the produce or by adhesive labels applied to the packages when microperforations are placed across and along the entire film. Finally, the size and location of the microperforations in the film also makes it impossible for the packaging user to quickly inspect the films for consistency of perforation size and number. These deficiencies have been roadblocks in the wide spread commercialization of films made according to this invention.

As indicated, the current practices of producing microperforated materials for modifying or controlling the atmosphere inside fresh produce packages are not satisfactory. There is a need for packaging in which the microperforations are registered in a small identifiable area that will not be blocked by adhesive labels or adjacent packages during package stacking or handling. The fresh produce should be placed in a product-specific package where the microperforation size, location, and number of microperforations are optimally selected to obtain the desired film gas transmission rates and gas flux for maintaining the quality of that specific produce item. In addition, a method is needed for accurately predicting the size and number of microperforations required by a particular weight of respiring produce at a specified temperature to maintain a pre-selected atmosphere inside the package during storage. And, there needs to be a cost-effective method of manufacturing microperforated packaging materials according to the requirements of the present invention.

SUMMARY OF THE INVENTION

Accordingly, an object of the present invention is to provide a registered microperforated polymeric packaging material with the microperforations situated in well-defined target areas of the packaging material.

Another object of the invention is to provide a means of calculating gas transmission requirements of respiring foods contained in registered microperforated polymeric packaging materials with microperforations having specific size, shape, location, and number in order to optimize the shelf life and quality of respiring foods.

A further object is to provide a packaging system, wherein registered microperforated polymeric packaging materials wherein specific size, type and location of the microperforations is matched to specific characteristics of respiring fresh produce to optimize storage life.

Another object of the invention is the method of manufacturing registered microperforated polymeric packaging materials, using a laser mounted above a stationary or moving polymer film web. The web-handling equipment can be a bagmaking machine, a slitter/rewinder, a printing press, a stand-alone web stopper, or a thermoforming unit. The system of the present invention employs a photoelectric sensor or other electrical means to signal the laser to ensure the microperforations are placed in a small identifiable area on the polymer web. There is a system controller, either a PLC (programmable logic controller), a PC (personal computer) or a combination of both, that takes the input from the sensor or other electrical signal and commands the laser to fire. The controller may also control the moving web.

This invention is directed to the specification, production, and use of product-specific, registered microperforated polymeric packaging materials selected from the group consisting of polyethylene, polypropylene, polyester, nylon, polystyrene, styrene butadiene copolymers, cellophane, and polyvinyl chloride, in monolayers, coextrusions, or laminates, for extending the quality and shelf life of respiring foods, particularly fresh fruits, fresh vegetables, fresh herbs, and fresh flowers, contained within the packaging.

Another object of the invention is a means of calculating the number of microperforations of a preferred size, for example, 120 to 160 microns, specified for the polymer packaging material to maintain pre-selected levels of $O_2$, $CO_2$, and $H_2O$ inside packages containing respiring fresh produce. The calculations can establish the optimal number of microperforations required in the packaging material for each microperforation size and shape.

And yet a further object of the invention is to provide a packaging system for the industry, wherein there is a matching of the packaging material gas transmission rates and the respiration rates of the fresh produce to maintain pre-selected atmospheres inside the packages during storage. The packaging is optimized for a particular item, extending the freshness and quality of the produce.

The present invention is an improved packaging for establishing optimal atmospheric conditions for respiring fresh fruits, vegetables, herbs and flowers, comprising a polymeric material with a set of microperforations in the polymeric material to control the atmosphere within specified $O_2$ and $CO_2$ concentrations in the presence of the respiring fresh produce, wherein the set of microperforations are placed in a registered target area on the polymeric material. The improved packaging material can be used to form a bag or a lidding film or a semi-rigid container.

The present invention is susceptible to many variations, including where the polymeric material is a heat-sealable film. Or where the polymeric material is formed into a semi-rigid container with a thickness in the range of 0.025 cm to 0.076 cm. And, where the polymeric material is selected from the group consisting of polyethylene, polypropylene, polyester, nylon, polystyrene, styrene butadiene, cellophane, and polyvinyl chloride, their blends, coextrusions, and laminates.

The present invention also includes a means of calculating the total $O_2$ Flux (cc $O_2$/day-atm) required by a particular product based on produce weight, respiration rate, storage temperature, and desired gas composition inside the package. The total $O_2$ Flux of the package is satisfied by calculating the $O_2$ Flux provided by the breathable, non-perforated surface area of the packaging material and determining the size, shape, and number of microperforations required to meet the total $O_2$ Flux requirements of the package. In the preferred embodiment, the optimal size, shape and number of the set of microperforations for the particular product is used for the registered target area. In most cases, the target area is a small identifiable area in an upper third or quarter of the package. More preferably, the registered microperforations are placed in any area that will not be occluded by produce or other packages during shipping and storage.

Each of the microperforations has a preferred average diameter between 110 and 400 microns, and more preferably 120–160 microns. It is further desired that the polymeric material that is microperforated have a $CO_2$ transmission rate that is 2.4 to 5.0 times greater than the film OTR, preferably 3.4 to 4 times greater than the film OTR.

The aspects of the present invention include a system of packaging fresh produce comprising the steps of calculating the total $O_2$ Flux required for a given weight of respiring produce item, package surface area, storage temperature, and a pre-selected $O_2$ and $CO_2$ atmosphere. Next, determining an optimal packaging material with a desired $CO_2$/ $O_2$ transmission rates wherein the packaging material contains registered microperforations designed for said $O_2$ Flux, placing the produce in the container derived from the packaging material, and hermetically sealing said container.

A further object of the invention is a microperforated packaging for a given quantity of respiring food produced by the process of calculating the number of microperforations for the given quantity of said respiring food, locating a target area for the microperforations, positioning laser over said target area, and drilling the microperforations in the target area.

Still another object is a microperforation system for making microperforations in a target area of packaging material, comprising a polymeric web, having a laser mounted over the web, a sensor means to identify the target area on the packaging material, and a means to control the laser to drill the microperforations in the target area. Laser drilling software is used to increase efficiency.

The microperforation system can be used on a stationary (stopped) web where the laser beam moves over the packaging material to drill the holes. The laser system is interconnected to a two-axis beam scanner, which directs the laser beam to drill holes in the desired location. Alternatively, the microperforation system can consist of a stationary laser beam and a moving polymer web. The laser is a $CO_2$ laser in the preferred embodiment. In order to provide registration of perforations, a photoelectric sensor is used to find the eye mark on the polymeric film or an electrical signal from the web-handling equipment is used to signal the laser to fire at a preselected location on the film.

A basic intent of the present invention is to make a system for computing an optimal number and size of microperforations to control a package atmosphere within specified $O_2$ and $CO_2$ concentrations. This system also has a means of computing an optimal number of microperforations to control package moisture vapor transmission rates while maintaining pre-selected $O_2$ and $CO_2$ concentrations.

An object of the invention is an improved packaging for establishing optimum atmospheric conditions for respiring fresh fruits, vegetables, herbs and flowers, comprising a polymeric material, a set of microperforations on the polymeric material, wherein the set of microperforations are calculated to control the optimum atmospheric conditions within specified $O_2$ and $CO_2$ concentrations for the respiring fresh fruits, vegetables, herbs and flowers, and wherein the set of microperforations are placed in a registered target area on the polymeric material.

A further object is an improved packaging for establishing optimum atmospheric conditions for respiring fresh fruits, vegetables, herbs and flowers wherein the polymeric material is selected from the group consisting of polyethylene, polypropylene, polyester, nylon, polystyrene, styrene butadiene, cellophane, and polyvinyl chloride, in monolayers, coextrusions, and laminates. Furthermore, an improved packaging material wherein the polymeric material is heat-sealable.

Other objects include an improved packaging material wherein the polymeric material has a thickness in the range of 0.4 to 8 mil. An improved packaging material wherein the polymeric material provides a total $O_2$ Flux ranging from 150 cc/day-atm to 5,000,000 cc/day-atm. An improved packaging material wherein the polymeric material provides a total $O_2$ Flux ranging from 200 cc/day-atm to 1,500,000 cc/day-atm.

And yet another object of the invention is an improved packaging material wherein the polymeric material forms a bag. Also, an improved packaging material wherein the polymeric material is a heat sealable lidding film. An improved packaging material wherein the polymeric material is formed into a semi-rigid container with a thickness greater than 8 mil.

An object of the invention is an improved packaging material further comprising a means of calculating an optimal number of the set of microperforations in the registered target area. An improved packaging material further comprising a means of calculating an optimal size of the set of registered microperforations. Also including an improved packaging material wherein the registered target area is a small identifiable area in an upper quarter of the package. Further objects include an improved packaging material wherein the registered target area is a small identifiable area in an upper third of the package. An improved packaging material wherein the registered target area is located in an area that prevents occlusion of the microperforations by product or other packages. Additionally, an improved packaging material wherein each of the microperforations has an average diameter between 110 and 400 microns, preferably 120–160 microns. Finally, an improved packaging material wherein the polymeric material has a $CO_2$ transmission rate that is 2.5 to 5.0 times greater than the $O_2$ transmission rate, most preferably 3.4 to 4.0 times greater.

Yet a further object is a system of packaging fresh produce comprising the steps of calculating the total oxygen flux of the polymeric material required for a given weight of respiring produce item, package surface area, storage temperature, and a pre-selected $O_2$ and $CO_2$ atmosphere, determining an optimal packaging material, wherein the packaging material contains registered microperforations designed for the $O_2$ and $CO_2$ transmission, placing the produce in the container derived from the packaging material and closing the container.

An object of the invention is a process of producing a microperforated packaging system for a given quantity of respiring food comprising the steps of selecting a polymeric packaging material for optimal $O_2$ and $CO_2$ transmission rates, calculating a number of microperforations required in the packaging material for the given quantity of the respiring food, locating a target area for the microperforations, positioning a laser over the target area, and drilling the microperforations in the target area.

An object includes a microperforation system for making microperforations in a registered target area of packaging material, comprising, a polymeric web, a laser mounted over the web, a sensor means to identify the target area on the packaging material, a means to control the laser to drill the microperforations in the target area. Additionally, a microperforation system wherein the laser is a $CO_2$ laser. Also, a microperforation system wherein the sensor is selected from the group comprising a through-beam photoelectric sensor and a photoelectric proximity sensor.

And yet another object is a microperforation system wherein the laser is triggered to drill holes in the target area with the target area identified using an electrical signal from the web-handling equipment. And, a microperforation system wherein the web is moving and the laser is stationary. It being understood that the term laser refers to the laser beams eminating from the laser delivery head or similar delivery device, and the laser optical system controls the firing of the laser beams.

A final object of the invention is a microperforation system further comprising a means of computing an optimal number and size of microperforations to control a package atmosphere within specified $O_2$ and $CO_2$ concentrations. Also, a microperforation system further comprising a means of computing an optimal number of microperforations to control package moisture vapor transmission rates while maintaining pre-selected $O_2$ and $CO_2$ concentrations. A microperforation system wherein the web is stationary and the laser is moving. And also, a microperforation system wherein the laser comprises a two-axis beam scanner mounted over the web.

Still other objects and advantages of the present invention will become readily apparent to those skilled in this art from the following detailed description, wherein only a preferred embodiment of the invention is described, simply by way of illustration of the best mode contemplated for carrying out the invention. As will be realized, the invention is capable of other and different embodiments, and its several details are capable of modifications in various obvious respects, all without departing from the invention.

BRIEF DESCRIPTION OF THE DRAWINGS

The present invention will be readily understood by the following detailed description in conjunction with the accompanying drawings, wherein like reference numerals designate like structural elements, and in which.

DESCRIPTION OF THE PREFERRED EMBODIMENT

In the following description, the units applied to terms used in reference to the $O_2$, and $CO_2$ transmission rates of a packaging material, i. e., "OTR and $CO_2$TR", respectively, are expressed as $cc/m^2$-day-atmosphere at 25° C., 75% RH. In the pressure units, one atmosphere (atm) is 101,325 $kg/ms^2$. The units describing the flow of a particular gas through a packaging material are "flux", expressed as cc/day-atm. The units applied to moisture vapor transmission ("MVTR") of a film are expressed as g $H_2O/m^2$-day-atm at 25° C., 75% RH.

Figure 1:
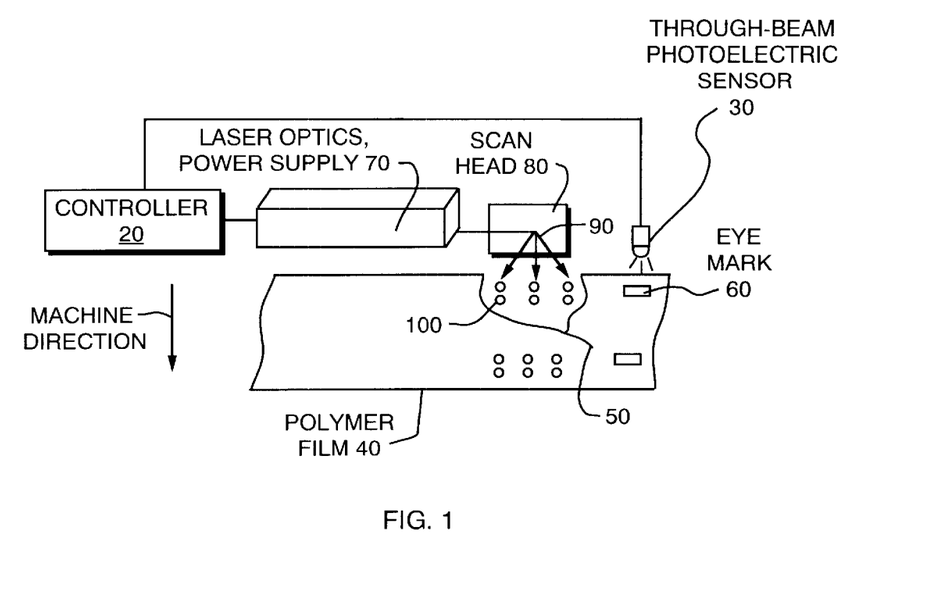
FIG. 1 depicts a microperforation system of a stationary film web wherein the moving laser beam drills the microperforations in the target area of what will be a finished bag.
Figure 2:
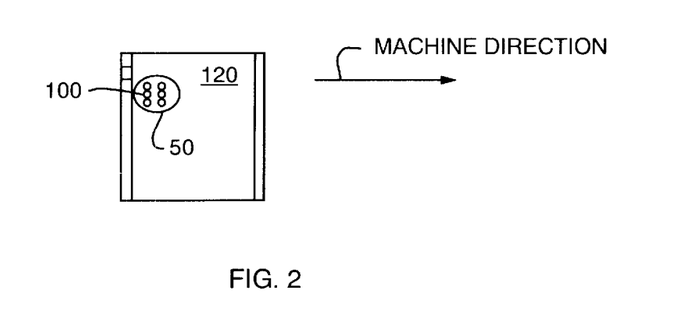
FIG. 2 shows a bag produced by the stationary web microperforation process.

As shown in FIG. 1, a $CO_2$ laser drilling system can be used to drill microperforations in a stopped polymer web (hereafter called "stopped web method"). This is essentially a low speed (50–150 ft/min) method for microperforating packaging materials using lasers mounted over the web-handling equipment. A controller 20 operates with input from the through-beam photoelectric sensor 30 to position the polymer film sheeting or tubing 40 and locate the target area 50. The polymer film 40 has an eye mark 60 which is detectable by the sensor 30. Once the eye mark 60 is detected, the registration of the film 40 is determined and the controller 20 sends a signal to the laser/optics power supply 70 which directs the laser beam to the scan head 80 where the laser beam 90 is directed onto the film 40 creating microperforations 100 in a pre-selected array defined by a computer program. The registered microperforated film 40 is then 20 converted into bags using bagmaking machines known to the industry. As an example, a polymer bag 120 with side seals is shown in FIG. 2, and the microperforations 100 are in a specific target area 50 of the bag 120.

For example, a simple drilling system consists of a 10-watt sealed beam air-cooled $CO_2$ laser with a controller 20, a power supply and focusing optics 70, and a two-axis beam scanner 80 mounted horizontally above the packaging material 40 web on a bagmaking machine, a slitter/rewinder, a print station or a stand-alone web stopper. The horizontal position of the laser system mounted over the web can be adjusted by mechanical or electronic methods so that the laser beam 90 is positioned over the area of the web to be microperforated 50. The laser system 70 is linked to a controller 20 which is also linked to a photosensor 30 or a mechanical timer on the web-handling equipment. In a preferred embodiment, all components are interfaced to a computer that uses laser drilling software to direct the laser to microperforate the packaging material in a pre-selected array.

Registered microperforations are produced by linking the laser drilling process to a signal from a photosensor 30 mounted on a bagmaking machine, a web stopper, a slitter/rewinder, or a printing press. When the photosensor 30 detects a printed eye mark 60 on the packaging material 40, this signal is used to direct the controller 20 to fire the laser 70 to drill a specified number of perforations in the packaging material in a pre-determined array, e.g. in 1 $cm^2$ with 150-micron perforations at each corner of the square, at a specific location on the web. Microperforation arrays 100 are normally positioned near what will become the upper one-quarter or one-third of the bag, as shown in FIG. 2, so when filled packages are placed in case cartons they are not occluded by adjacent packages in the carton. For heat-sealable lidding films used with rigid plastic trays, the perforations 100 are registered in areas of the lid that will not be occluded during stacking.

The photosensor detection process uses a printed eye mark on the packaging material. Photoelectric sensors detect an object when it interrupts the sensing path. For example, the edge of a film is printed with a colored eye mark (a small, solid rectangular bar, usually black in color) at defined locations along the web to designate where microperforations are to be drilled in the film. A photoelectric sensor is mounted on the web-handling equipment. When the sensor beam passes over the eye mark on the film, the eye mark interrupts the beam and therefore, it is sensed by the photoelectric sensor. This beam interruption is detected by the controller which then directs the laser to drill a specified number of perforations in the film directly acoss from the eye mark or at a defined distance from the eyemark in a location where the laser head is positioned above the plastic web. The location of the microperforations from the eye mark can be varied by moving the laser housing, either mechanically or electrically, over the target area of the plastic web.

For other photoelectric sensing modes, it is not necessary to have a printed eye mark to detect the object. In the photoelectric proximity mode, an object is sensed when the sensor's own transmitted energy is reflected back from the object's surface. If there is no object present, this reflection does not occur. Proximity sensors could be used to signal the laser to microperforate semi-rigid plastic trays for fresh produce packaging.

A wide range of polymer materials (monowebs, coextrusions, and laminates), can be microperforated with lasers, including polypropylene, polyethylene, polyester, polystyrene, styrene butadiene copolymers, nylon, cellophane, or polyvinyl chloride. The preferred drilling method uses $CO_2$ lasers mounted over stationary or moving polymer webs. Photoelectric sensor methods or other electrical signals can be used to register microperforations in polymer materials. The photoelectric sensor method is accurate and reliable and is the preferred method of this invention.

When the stopped web method is used on a bagmaking machine, the drilling can occur during the heat-sealing portion of the bagmaking cycle, because in this short time span (about 400 msec), the web is essentially stationary. In effect, the web is stopped, an electrical signal from the bagmaking machine timer directs the laser to commence the drilling. Alternatively, a stand alone web stopper can be used to stop the web (using a series of accumulator rolls) for the drilling operation.

From 1 to over 200 microperforations can be drilled into the packaging material during a single stop phase (stopped web method) with the beam scanner perforating in a serpentine pattern to minimize total perforation time. The more holes that are drilled, the longer the drilling operation takes. For most applications 1–100 microperforations are needed with 1–7 msec drilling time for each microperforation. If drilling occurs through two thickness of material at the same time, as would be the case when microperforating plastic tubing, then the number of holes drilled per laser firing doubles.

For the stopped web method that uses a two-axis beam scanner, the microperforations can be drilled in a variety of different patterns or arrays, e.g., straight lines, rectangles, squares, and circles. The most time-efficient method is to place the microperforations in a straight line or square. If microperforations are placed in a square or a rectangular array, the most time-efficient drilling occurs when the laser follows a serpentine pattern. The size of the microperforations is determined by adjusting the laser power (30–100% of the maximum power) and drilling duration.

Higher power and longer duration give larger microperforations than lower power and shorter duration. Preferably, the laser should be set at 70% of maximum power and the duration should be varied to produce the desired perforation size. As the perforation size increases the OTR of the perforation also increases.

Figure 3:
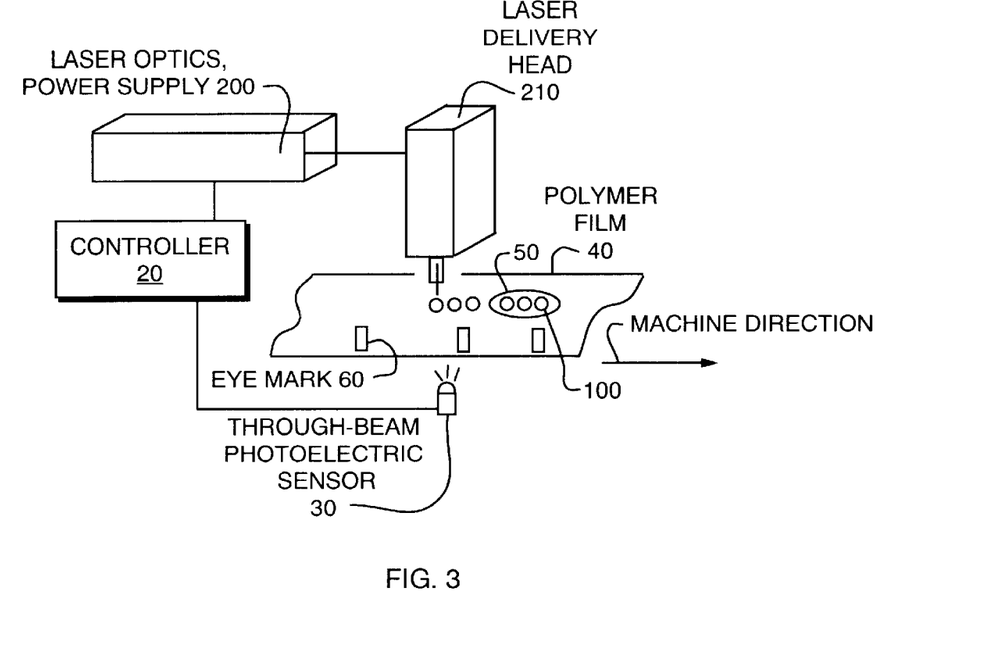
FIG. 3 depicts a microperforation system wherein the stationary laser beam drills the microperforations in the target area of the film as the web is moving.
Figure 4:
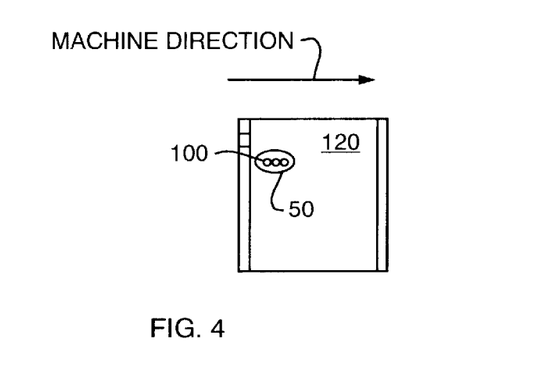
FIG. 4 shows a bag produced by the moving web microperforation process.

Registered microperforations 100 can be drilled in moving packaging material webs, as shown in FIG. 3, using higher power $CO_2$ lasers. Hereafter this process will be referred to as "microperforating on the fly." A controller 20 for the moving web receives input from the photoelectric sensor 30, and controls the power supply 200 to the laser optics. As the polymer film 40 moves through the web-handling equipment, the sensor 30 detects the eye mark 60, and the signal is communicated to the controller 20. The controller 20 operates the laser power supply and optics 200, which, in turn, powers the laser and directs the laser beam to the stationary laser delivery head 210 to drill a specific number of microperforations 100 in the target area 50. As an example, a polymer bag 120 with side seals is shown in FIG. 4, and the microperforations 100 are in the specific target area 50 of the bag 120.

The power requirements (25-watt to >700-watt) depend on the speed the web will be traveling, and the composition and the thickness of the materials to be drilled. Faster speeds and thicker packaging materials require higher power lasers than slower speeds and thinner packaging materials. For microperforating on the fly, a stationary laser beam delivery head mounted on a printing press, slitter/rewinder, or bag-making machine is used to produce a specified number of microperforations, usually one to 50, in a short line, generally 7 cm or less, running in the machine direction of the moving film web. When the photosensor 30 detects a printed eye mark on the packaging material, this signal is used to trigger the laser to drill a specified number of perforations 100 in a straight line on the material in the target area 50 of the impression. In this application, the laser power and the speed of the web determine the size and shape of the microperforations that are made. The faster the speed, the more elongated the microperforations become. If multiple segments of the same bag or package impression (boundaries of the package) must be microperforated to provide the necessary $O_2$ Flux, then multiple eye marks 60 are needed to signal the laser 200 to fire at each location in the bag or package impression.

If more than one lane of microperforations is needed for microperforating on the fly, as would be the case for microperforating two side-by-side printed impressions of a packaging material or two microperforation lanes in the same impression, multiple lasers can be mounted on the web handling equipment or a beam splitter can be used to split the beam from one laser to multiple delivery heads.

Various hole sizes and shapes are created when plastic materials are perforated with lasers. Whatever laser drilling method is used, either stopped web or microperforating on the fly, the packaging material composition, degree of orientation, and structure (monolayer, coextrusion, or laminate) affect the size, shape and $O_2$ Flux of the resulting microperforations. Computer software that directs the laser perforating process can affect the shape of the perforation, i.e., the time delay between each hole in the perforation. However, software factors can be easily changed to alter the perforation shape. In contrast, polymer materials have inherent physical/chemical characteristics that will impact the hole size and shape for any given power and pulse duration. For example, stationary monowebs of polyethylene films perforated with a beam from a 10-watt $CO_2$ laser (stopped web), produce perforations that are elongated, having -aspect ratios (ratio of the longest to the shortest diameter) greater than 1.2. In contrast, when heat-seal coated polyester films are perforated under identical conditions, the perforations are nearly spherical with aspect ratios of 1–1.2. When lasers drill moving polymer webs, faster speeds (>300 ft/min) may produce more elongated perforations, with aspect ratios of 1.8, depending on the polymer film composition and speed of the web. These differences in microperforation shape affect the $O_2$ Flux. Perforations with the same size long diameter but different size short diameters have different $O_2$ Flux. That is, microperforations with aspect ratios (ratio of the longest to the shortest diameter) of close to 1 have higher $O_2$ Flux than perforations with aspect ratios >1.

Figure 5:
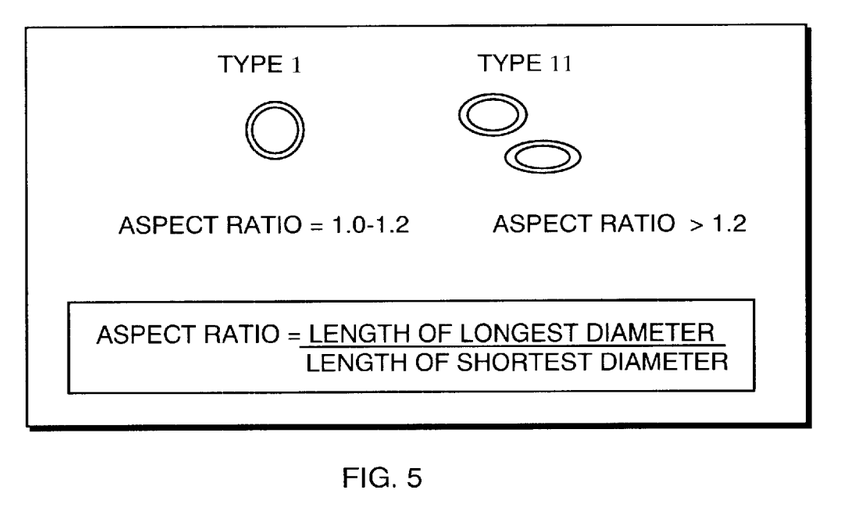
FIG. 5 shows a Type I microperforation with an aspect ratio of 1 to 1.2, and shows Type II microperforations with an aspect ratio >1.2.

A wide range of microperforation sizes can be used to control the atmosphere inside fresh produce packaging. However, in the preferred embodiment, microperforations in the range of 110–400 microns (longest diameter), preferably, 120–160 microns, offer the most benefits in controlling desired $O_2$ and $CO_2$ levels inside the package. Based on our research with a wide range of polymer materials, microperforation shapes can be classified into two broad categories. Type I category consists of holes with an aspect ratio (the ratio of the longest diameter to the shortest diameter) of 1–1.2, as shown in FIG. 5. This is typical for polyesters and polypropylene films with heat-seal coatings.

Type II category of microperforations, observed in polyethylene monowebs and polyethylene coextrusions, has an aspect ratio >1.2, illustrated in FIG. 5. There is an elongation (slight to exaggerated) of the microperforation, often in the direction of the film orientation, forming an oval or elliptical shape.

An analytical method using an oxygen sensor was used to determine the $O_2$ Flux through microperforations of individual, 150-micron (longest diameter) perforations from the two categories of microperforations describe above. The average values for $O_2$ Flux for one, 150 micron perforation are as follows:

Type I microperforation (aspect ratio 1.0–1.2) is 250 cc/day-atm.

Type II microperforation (aspect ratio >1.2) is 200 cc/day-atm.

Experimental results showed that the range of $O_2$ Flux values for these microperforations varies by +/−6% of the stated value. The $O_2$ Flux of the microperforations is not dependent on the thickness of the film that is microperforated.

The range of $O_2$ Flux that can be created by registering microperforations, in polymer materials by the laser methods described above, is very broad. Although microperforated films, according to the present invention, can be made with an $O_2$ Flux ranging from 150 cc/day-atm to over 5,000,000 cc/day-atm, the preferred range is 200 to 1,500,000 cc/day-atm for controlling or modifying the atmosphere inside fresh produce packages varying in weights from 19 g to several thousand kg.

Knowing the $O_2$ Flux of individual microperforations makes it a relatively simple task to calculate the size and number of microperforations needed to establish a desired atmosphere inside a package containing fresh fruit, fresh vegetables, fresh herbs, fresh flowers or other biochemically active foods.

EXAMPLE 1

To determine the number and size of microperforations needed for each produce item in a particular package, the gas transmission requirements ($O_2$, $CO_2$, moisture vapor transmission rate—MVTR) for the total package is first determined. The contribution the microperforations must make to the total gas transmission properties of the package is affected by:

produce respiration rate, weight of produce to be packaged, desired atmosphere in the package, breathable surface area of the package, gas transmission properties ($O_2$, $CO_2$, MVTR) of the packaging material to be microperforated, and expected storage temperatures during the life of the product.

Different fresh produce items, whether whole or fresh-cut, have different respiration rates. Cutting the produce item generally increases the respiration rate by 2-fold or more.

Equations (1), (2), and (3) below can be used to determine the total $O_2$ Flux ($Flux_{O2\text{-}Total}$) requirements of a fresh produce package, including the $O_2$ Flux of the breathable area of the packaging film ($Flux_{O2\text{-}film}$), and the $O_2$ Flux of the microperforations ($Flux_{O2\text{-}MP}$), required to maintain a desired atmosphere inside a package containing a specific fresh fruit, fresh vegetable, fresh herb or fresh flower.

$$OTR_T = [(M \times RR)/(A_s P(0.21 - IntO_2))] \times 24 \text{ hrs/day} \quad (1)$$

where, $OTR_T$ = total $OTR$ required for the package in cc $O_2/m^2$-day-atm $M$ = mass of produce (kg)

$RR$ = respiration rate (cc $O_2$/kg/hr) @ the expected storage temperature $A_S$ = breathable surface area of the package ($m^2$)

$P$ = atmospheric pressure (atm), assumed to be 1

$Int\ O_2$ = desired $O_2$ atmosphere inside the package stated as a volume fraction (i.e., if the desired $O_2$ is 8%, the volume fraction is 0.08).

The value 0.21 represents the volume fraction of $O_2$ in ambient air.

For example: To establish an atmosphere at 5° C. of 8% $O_2$ and 10–15% $CO_2$ inside a 25.4 cm wide ×40.6 cm long ×50 micron thick polyethylene bag ($OTR_{base\text{-}film}$=3100 cc/$m^2$-day-atm) containing 1.36 kg of broccoli florets, with an $O_2$ respiration rate of 31 cc/kg/hr, the $OTR_T$ required by the package would be:

$$OTR_T = [(1.36 \text{ kg} \times 31 \text{ cc/kg/hr})/(2(0.254 \text{ m} \times 0.356 \text{ m})) \times$$
$$1 \text{ atm}(0.21 - 0.08)] \times 24 \text{ hr/day}$$
$$= 43{,}038 \text{ cc/m}^2\text{-day-atm}$$

Note that the breathable surface area is less than the total dimensions of the bag because the top seal and the film skirt beyond the seal are subtracted since they do not contribute to the $OTR_T$.

Once the $OTR_T$ requirements for a particular item and package size are determined from equation (1), then the $O_2$ flow through the breathable surface area of the bag per day ($Flux_{O2\text{-}film}$ in cc/day-atm), is calculated using equation (2):

$$Flux_{O2\text{-}film}(\text{cc/day-atm}) = OTR_{base\text{-}film}(\text{cc/m}^2\text{-day-atm}) \times A_s(m^2) \quad (2)$$

For example: The dimensions of the breathable area of a plastic bag used to package 1.36 kg of fresh-cut broccoli are 25.4 cm ×35.6 cm (×2 for 2 sides), and the OTR of the base film is 3100 cc/$m^2$-day-atmosphere. The $Flux_{O2\text{-}film}$ (cc/day-atm) through the breathable area of the bag is:

$$Flux_{O2\text{-}film} \text{ (cc/day-atm)} = (3100 \text{ cc/m}^2\text{-day-atm}) \times 0.181 \text{ m}^2$$
$$= 561 \text{ cc/day-atm}$$

However, a total $Flux_{O2\text{-}Total}$ of 7790 cc/day-atm is needed for this package:

$$Flux_{O2\text{-}total} = OTR_T \text{ cc/m}^2\text{-day-atm} \times A_S(m^2)$$

$$Flux_{O2\text{-}total} = 43{,}038 \text{ cc/m}^2\text{-day-atm} \times 0.181 \text{ m}^2 = 7790 \text{ cc/day-atm}$$

Therefore, the majority of $Flux_{O2\text{-}Total}$ must be supplied by the microperforations ($Flux_{O2\text{-}MP}$):

(3) $Flux_{O2\text{-}MP} = Flux_{O2\text{-}Total} - Flux_{O2\text{-}film}$ $$= 7790 \text{ cc/day-atm} - 561 \text{ cc/day-atm} = 7229 \text{ cc/day-atm}$$

The number of 150 micron (longest diameter) perforations required in this 2 mil polyethylene package is equal to:

(7229 cc/day-atm)/(200 cc/day-atm per Type II microperforation)= 36

For this film, if the longest diameter of the average microperforation is smaller or larger than 150 microns, the number of perforations can be adjusted to meet the required $Flux_{O2\text{-}Total}$ for the package. For example, if the microperforations made in the polyethylene film were 120 microns (Type II) in the longest diameter, then each 120 micron perforation would have a $Flux_{O2\text{-}120\mu}$ of 160 cc/day-atm:

$Flux_{O2\text{-}120\mu}$ perf=(120 micron×200 cc/day-atm)/(150 microns)=160 cc/day-atm To maintain an 8% $O_2$ and 10–15% $CO_2$ atmosphere inside a 0.181 $m^2$ polyethylene bag containing 1.36 kg broccoli florets stored at 5° C., it would require 45, 120-micron perforations to give the same $Flux_{O2\text{-}MP}$ as 36, 150-micron perforations.

To test the accuracy of the method to predict the size and number of microperforations required to maintain a desired atmosphere inside a package containing a respiring produce item, 50 micron polyethylene tubing was blown by standard extrusion methods and used to make 25.4 cm wide ×40.6 cm long bags which were microperforated in-line on a bagmaking machine using a 10-watt $CO_2$ laser and the stopped web method. Thirty-six, 150 micron perforations were registered in a 6.45 cm² (1 in²) array located 7.6 cm from the open end of the bag and 5 cm from the side seal. An electrical signal from the bagmaking machine was used to trigger the laser to fire at the same time the heat sealing bar made the bag side seal.

Figure 6:
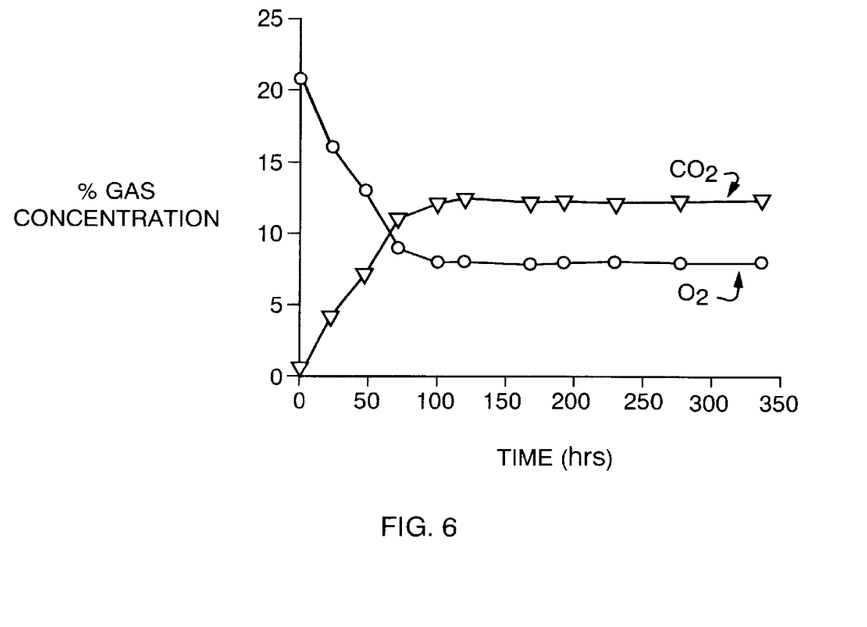
FIG. 6 depicts the oxygen and carbon dioxide contents inside 3-lb. packages of broccoli florets sealed in registered microperforated bags having 36, 150-micron perforations. Storage temperature was 4–5° C.

Broccoli florets were prepared at 4° C. in a commercial processing plant and 1.36 kg was packaged into each bag (25.4 cm wide ×40.6 cm long, 50 micron thick). Filled bags were packed vertically into corrugated cartons with the registered microperforations at the top of the carton. Cartons were stored at 4–5° C. for 14 days. FIG. 6 represents the % headspace gas concentration over time, in microperforated bags (36 microperforations with an average size of 150 microns) containing 1.36 kg of broccoli florets. A steady state atmosphere of 8–10% $O_2$ and 8–12% $CO_2$ was reached after 60 hrs at 5° C. After 2 weeks at 5° C., floret color remained bright green, there was little or no evidence of browning at the cut ends, and no off-odors were observed on opening the bag.

EXAMPLE 2

Equations (1), (2), and (3) were used to determine the size and number of microperforations needed to maintain an atmosphere of 10–12% $O_2$ and 8–10% $CO_2$ inside a polyethylene pallet bag (125 cm wide×102 cm full gusset×203 cm long×100 micron thick) containing 217.9 kg of fresh sweet cherries at 1.1 C. The $OTR_{base}$=1085 cc/m²-day-atm. Ninety-one cm of the bag length will be used to seal the bag by gathering the plastic at the top of the pallet, twisting it, doubling over the neck, and closed tightly with an electrical tie. Therefore, the breathable area of the bag will be 125 cm wide×102 cm gusset×112 cm long.

The equations for this package are:

$$(1)\ OTR_T\ (cc/m^2\text{-hr-atm}) = (217.9\ kg \times 5\ cc/kg/hr) /$$
$$(2.54\ m^2 \times 1\ atm\ (0.21 - 0.11))$$
$$OTR_T\ (cc/m^2\text{-day-atm}) = 4289\ cc/m^2\text{-hr-atm} \times 24\ hr/day$$
$$= 102{,}936\ cc/m^2\text{-day-atm}$$
$$(2)\ Flux_{O2-film}\ (cc/day\text{-atm}) = 1085\ cc/m^2\text{-day-atm} \times 2.54\ m^2 =$$
$$2756\ cc/day\text{-atm}$$
$$(3)\ Flux_{O2-MP} = (102{,}936\ cc/m^2\text{-day-atm} \times 2.54\ m^2) -$$
$$2756\ cc/day\text{-atm}$$
$$= 258{,}701\ cc/day\text{-atm}$$

Microperforations were drilled into a 58 cm² area 86 cm up from the bottom seal and in the middle of the front panel of the bag (125 cm wide×102 cm gusset×203 cm long, 100 micron thick). Both sides of the bag were microperforated with a laser using the stopped web method. The total number of 300-micron microperforations drilled into each bag was 646 (323 in the front panel and 323 in the back panel):

(258,701 cc/day-atm)/(400 cc/day-atm for each 300 micron Type II microperforation)=647

Twenty four boxes of cold Bing cherries, each containing 9.1 kg of cherries, were stacked inside the microperforated pallet bag that was draped over a 102 cm×122 cm wooden pallet. The filled bag was pulled over the top of the cartons, it was hermetically sealed, and the pallet was stored at 1.1 C. After 8 weeks at 1.1 C, headspace gas analysis of the sealed pallet bag indicated that the cherries had established an atmosphere of 12% $O_2$ and 8% $CO_2$. Sensory evaluation of the cherries showed that flesh color was maintained, cherry stems were green and had not darkened during storage, there was no evidence of mold growth, and eating quality was good.

EXAMPLE 3

Equations (1), (2) and (3) were used to determine the size and number of microperforations needed to maintain an atmosphere of 10% $O_2$ and 10–15% $CO_2$ (at 5° C.) inside a 15-cm diameter semi-rigid bowl (0.056 cm thick polyester/PE laminate) containing 227 g fresh-cut cantaloupe and sealed with a flexible heat-sealable lidding film made from a laminate of oriented polypropylene and polyethylene ($OTR_{base}$=1550 cc/m²-day-atm). The OTR of the bowl does not contribute significantly to the $Flux_{O2\text{-}Total}$.

The equations for this package are:

$$(1)\ OTR_T\ (cc/m^2\text{-hr-atm}) = (0.23\ kg \times 6\ cc/kg/hr) /$$
$$(1.8 \times 10^{-2}\ m^2 \times 1\ atm\ (0.21 - 0.10))$$
$$OTR_T\ (cc/m^2\text{-day-atm}) = 697\ cc/m^2\text{-hr-atm} \times 24\ hr/day$$
$$= 16{,}728\ cc/m^2\text{-day-atm}$$
$$(2)\ Flux_{O2-film}\ (cc/day\text{-atm}) = 1550\ cc/m^2\text{-day-atm} \times 1.8 \times 10^{-2}\ m^2 =$$
$$28\ cc/day\text{-atm}$$
$$(3)\ Flux_{O2-MP} = (16{,}728\ cc/m^2\text{-day-atm} \times 1.8 \times 10^{-2}\ m^2) -$$
$$28\ cc/day\text{-atm}$$
$$= 273\ cc/day\text{-atm}$$

One, Type II 205-micron perforation (produced with a stationary laser beam and a moving polypropylene/polyethylene laminate film web) is needed to provide the necessary OTR for 227 g cantaloupe stored in a semi-rigid tray at 5° C.

Samples of polypropylene/polyethylene lidding film were microperforated using a stationary laser and a moving polymer film web (microperforating on the fly). One microperforation, with an average diameter of 200–210 micron, was drilled into each impression at the eye mark. The microperforated lidding film was used to seal fresh-cut cantaloupe inside the 15 cm diameter bowls. Bowls were stored at 5° C. for 10 days and evaluated for headspace gas contents and changes in quality.

Headspace analysis showed that, one, 200 to 210-micron perforation controlled the atmosphere inside 227 g packages of fresh-cut cantaloupe at desired $O_2$ and $CO_2$ levels and maintained satisfactory product quality for 10 days at 5° C. Having at least one microperforation in the package also prevented the package seals from rupturing due to changes in pressure when such packages were shipped over mountains in refrigerated trucks.

EXAMPLE 4

The moisture vapor transmission rate (MVTR) of a packaging material is also important in maintaining the quality of packaged produce. The relative humidity inside most produce packages is between 96 and 99%. High relative humidity, in combination with excess free water in the package, can limit fresh produce shelf life by fostering microbial growth that leads to watery/slimy deterioration of plant tissues. Most non-perforated polyethylene or polypropylene films have a MVTR of less than 15 g/m$^2$-day. Microperforating the package can increase the MVTR range from 30 to >600 g/m$^2$-day. The increase in film MVTR caused by microperforations improves shelf life of water sensitive produce.

Packaged spinach deteriorates quickly if excess moisture accumulates in the package during storage. Therefore, the most important goal in spinach packaging is to use microperforations to increase the package MVTR without causing the leaves to dehydrate and lose their turgor. $O_2$ levels should be held just below ambient air (i.e., $O_2$=16–19%) and $CO_2$ levels slightly elevated above ambient air ($CO_2$= 2–5%).

Equations (1), (2), and (3), were used to determine the size and number of microperforations needed to maintain an atmosphere of 17–19% $O_2$ and 2–3% $CO_2$ inside bags containing 284 g spinach and stored at 5° C. Bags size was 25.4 cm wide×40.6 cm long (breathable area=25.4 cm×35.6 cm×2 sides) and film composition was 76-micron polyethylene ($OTR_{base}$=3255 cc/m$^2$-day-atm):

$$(1)\ OTR_T\ (cc/m^2\text{-hr-atm}) = (0.284\ kg \times 46\ cc/kg/hr) /$$
$$(0.181\ m^2 \times 1\ atm\ (0.21 - 0.17))$$
$$= 1804\ cc/m^2\text{-hr-atm}$$
$$OTR_T\ (cc/m^2\text{-day-atm}) = 1804\ cc/m^2\text{-hr-atm} \times 24\ hr/day$$
$$= 43{,}296\ cc/m^2\text{-day-atm}$$
$$(2)\ Flux_{O2-film}\ (cc/day\text{-atm}) = 3255\ cc/m^2\text{-day-atm} \times 0.181\ m^2 =$$
$$589\ cc/day\text{-atm}$$
$$(3)\ Flux_{O2-MP} = (43{,}296\ cc/m^2\text{-day-atm} \times 0.181\ m^2) -$$
$$589\ cc/day\text{-atm}$$
$$= 7248\ cc/day\text{-atm}$$

Lasers make Type II microperforations in polyethylene. Therefore, this 284 g bag requires 36, 150-micron perforations, i. e., (7248 cc/day-atm)/(200 cc/day-atm per 150-$\mu$ perforation).

Thirty-six laser microperforations, with an average diameter of 150 microns, were registered in a 6.45 cm$^2$ area, 7.6 cm from the bag open end and 7.6 cm from the side seal of the 25.4 cm wide ×40.6 cm long bags using the stopped web method. Bags were filled with freshly washed and spun-dried spinach in a commercial 4° C. processing room before heat-sealing and storing at 5° C. for 14 days. After 3 days, the headspace $O_2$ and $CO_2$ ranged from 17–20% and 3%, respectively, which was maintained throughout the 14-day storage study. Spinach leaves maintained their bright green color and turgor and did not show signs of dehydration or watery deterioration. Water loss from the package was about 2–3% after 14 days at 5° C.

EXAMPLE 5

The OTR and MVTR of packaging material are not the only important gas transmission rates in maintaining produce quality in MAP/CAP packages. $CO_2$TR determines the internal $CO_2$ atmosphere in the package and also affects package appearance. A low $CO_2$TR and a low $CO_2/O_2$ ratio film may cause package puffing (distention). If $CO_2$TR is too high, a collapsed package may result. The $CO_2/O_2$ ratio of microperforations is 1. However, the following example shows the importance of selecting base polymer films for microperforating that have sufficient $CO_2$TR to maintain an acceptable package appearance and internal $CO_2$ concentration.

Figure 7:
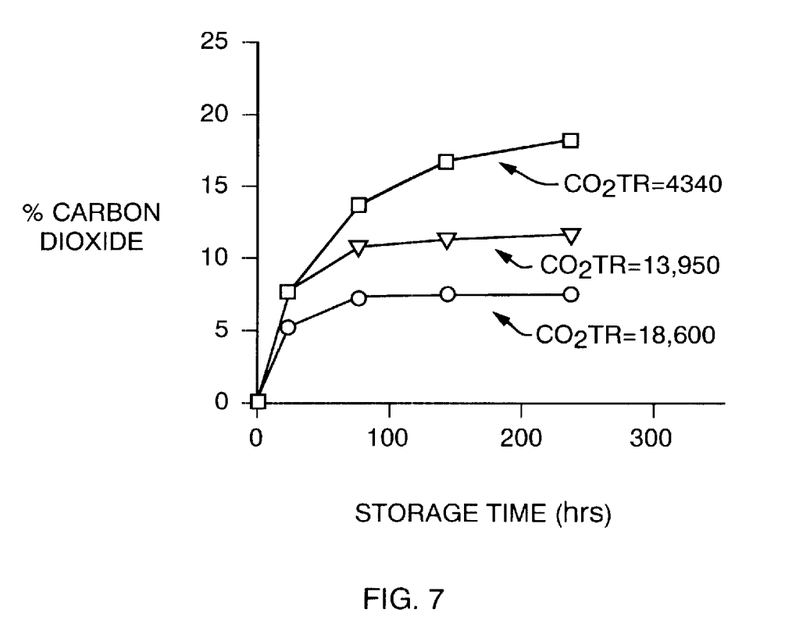
FIG. 7 depicts carbon dioxide content inside 3-lb. packages of broccoli florets sealed in registered microperforated bags having 36, 150-micron perforations with base packaging films having different carbon dioxide transmission rates. Storage temperature was 4–5° C.

Three polymer films with similar base film OTRs and different $CO_2$TRs were microperforated by the stopped web method, registering 36 microperforations in a 6.45 cc$^2$ area in the top quarter of the formed bag. Fresh-cut broccoli florets (1.36 kg) were sealed in the bags and stored at 5° C. As shown in FIG. 7, the $O_2$ atmosphere inside packages made from the different polymers equilibrated at 8–10% after 48 hrs and maintained that level throughout storage. However, the content of $CO_2$ inside the packages varied with the $CO_2$TR of the film. Packages with the lowest $CO_2$TR became distended during storage, and those with the highest $CO_2$TR collapsed, looking more like a vacuum package than a pillow pack. The base polymer film with a $CO_2$TR of 13,950 cc/m$^2$-day-atm and a $CO_2$TR/OTR of 3.6 to 4.0 was optimum for preventing discoloration of broccoli cut ends and off-odors and for maintaining an acceptable package appearance.

EXAMPLE 6

Polymeric packaging materials used to make semi-rigid containers, range in thickness from 0.025 cm to 0.076 cm. Delicate fruits like strawberries, raspberries, and blueberries are routinely packaged in containers having two semi-rigid parts: a rigid tray and a rigid lid. We tested the hypothesis that a semi-rigid container with registered microperforations in the semi-rigid lid could be used to control the atmosphere within a fresh produce package, thereby extending shelf life.

Polyvinyl chloride sheeting was thermoformed into a tray (0.143 m wide×0.197 m long×0.057 m deep, 0.056 cm thick) and rigid lid (0.143 m wide×0.197 m long×0.013 m deep) for packaging 0.454 kg sliced strawberries. This 0.056 cm thick package is essentially impermeable, having an OTR of <7 cc/m$^2$-day-atm. Therefore, all the $O_2$ Flux for maintaining a desired atmosphere of 8 to 10% $O_2$ and 10 to 15% $CO_2$ at 4° C. must come from the microperforations. The microperforations will be placed in a 1 cm$^2$ (0.0001 m$^2$) area on the lid, essentially the only breathable portion of the package. Equations (1) and (3) were used to determine the size and number of microperforations needed in the lid to maintain the desired atmosphere inside the package:

$$(1)\ OTR_T\ (cc/m^2\text{-hr-atm}) = (0.454\ kg \times 22\ cc/kg/hr) /$$
$$(0.0001\ m^2 \times 1\ atm\ (0.21 - 0.10))$$
$$= 908{,}000\ cc/m^2\text{-hr-atm}$$
$$OTR_T\ (cc/m^2\text{-day-atm}) = 908{,}000\ cc/m^2\text{-hr-atm} \times 24\ hr/day$$
$$= 21{,}792{,}000\ cc/m^2\text{-day-atm}$$
$$(3)\ Flux_{O2-MP} = 21{,}792{,}000\ cc/m^2\text{-day-atm} \times 0.0001\ m^2 =$$
$$2179\ cc/day\text{-atm}$$

Laser drilling of polyvinyl chloride sheet produces Type I microperforations. Therefore, 9, 150-micron perforations, each with a $Flux_{O2}$ of 250 cc/ day-atm, are needed to maintain the desired atmosphere in the package at 4° C.:

2179 cc/day-atm /250 cc/day-atm for each Type I microperforation=9 microperforations Rigid polyvinyl chloride lids were microperforated using a 10-watt laboratory laser with a scan head (stopped web method). Nine, 150-micron perforations were drilled into each lid. Freshly sliced strawberries (0.454 kg) were placed in containers, microperforated lids were applied, and a band of shrink tape was applied over the flange area to achieve a hermetic seal. Packages were stored at 4° C. for 14 days.

Within 48 hrs, the atmosphere inside the packages had equilibrated to the desired $O_2$ and $CO_2$ levels. The strawberries maintained their color and turgor, and there was no obvious mold growth on the fruit during a 14 day storage period at 4° C.

The present invention has been particularly shown and described with respect to certain preferred embodiments of features. However, it should be readily apparent to those of ordinary skill in the art that various changes and modifications in form and details may be made without departing from the spirit and scope of the invention as set forth in the following claims. The objects and advantages of the present invention may be further realized and attained by means of the instrumentalities and combinations particularly pointed out in the appended claims. Accordingly, the drawing and description are to be regarded as illustrative in nature, and not as restrictive.

What is claimed is:

1. A microperforation system for making microperforations in a registered target area of packaging material, comprising:

a polymeric web;

a laser mounted over said web;

a sensor to identify said target area on said packaging material;

a laser controller to drill said microperforations in said target area; and a processor coupled to said laser controller and said sensor, said processor performing calculations, wherein said calculations control a fresh produce package atmosphere within specified $O_2$ and $CO_2$ concentrations and wherein said calculations determine an optimal number and size of said microperforations of said target area.

2. The microperforation system according to claim 1, wherein said laser is a $CO_2$ laser.

3. The microperforation system according to claim 1, wherein said sensor is selected from the group comprising a through-beam photoelectric sensor, a photoelectric proximity sensor, and a timer.

4. The microperforation system according to claim 1, wherein said laser is triggered to drill holes in said target area wherein said target area is identified by said sensor.

5. The microperforation system according to claim 1, wherein said web is moving and said laser is stationary.

6. The microperforation system according to claim 1, further comprising a means for computing an optimal number of said microperforations to control package moisture vapor transmission rates while maintaining said $O_2$ and $CO_2$ concentrations.

7. The microperforation system according to claim 1, wherein said web is stationary and said laser is moving.

8. The microperforation system according to claims 7, wherein said laser comprises a two-axis beam scanner mounted over said web.

* * * * *

UNITED STATES PATENT AND TRADEMARK OFFICE
CERTIFICATE OF CORRECTION

PATENT NO. : 6,441,340 B1
DATED : August 27, 2002
INVENTOR(S) : Verriano-Marston, Elizabeth It is certified that error appears in the above-identified patent and that said Letters Patent is hereby corrected as shown below:

Column 9,
Line 48, deleted "20"

Column 10,
Line 9, delete "comer", insert -- corner --

Column 12,
Line 21, delete "-aspect", insert -- aspect --

Column 17,
Line 55, "3%", insert -- 1-3% --

Signed and Sealed this

Twenty-eighth Day of October, 2003

JAMES E. ROGAN
*Director of the United States Patent and Trademark Office*